L. O. MARKHAM.
PIPE JOINT.
APPLICATION FILED DEC. 28, 1915.
1,210,090. Patented Dec. 26, 1916.
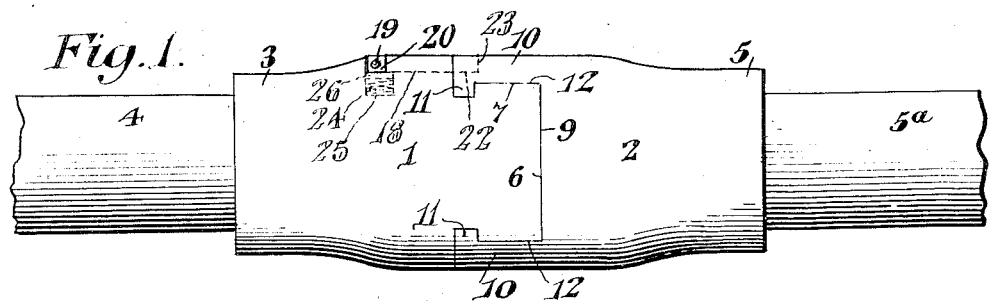
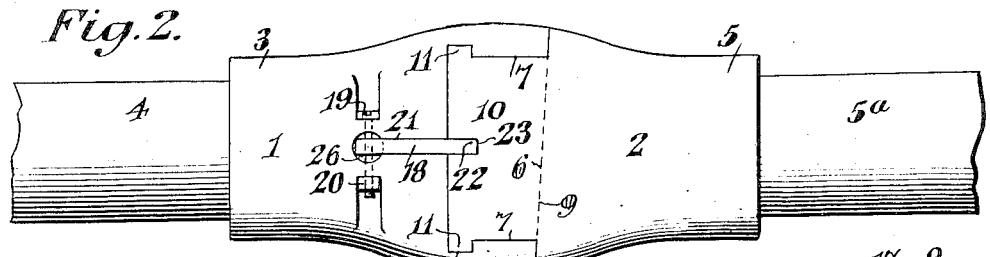
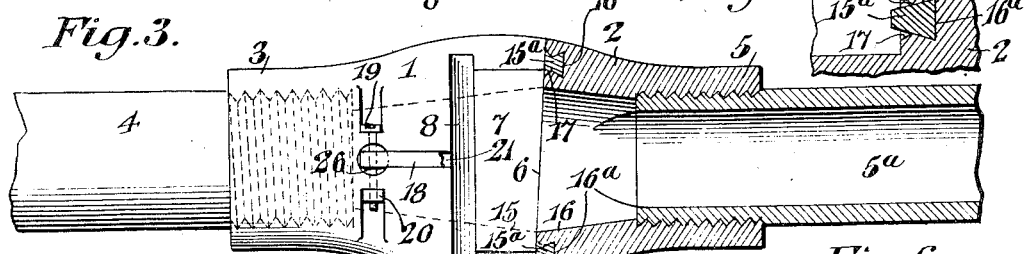
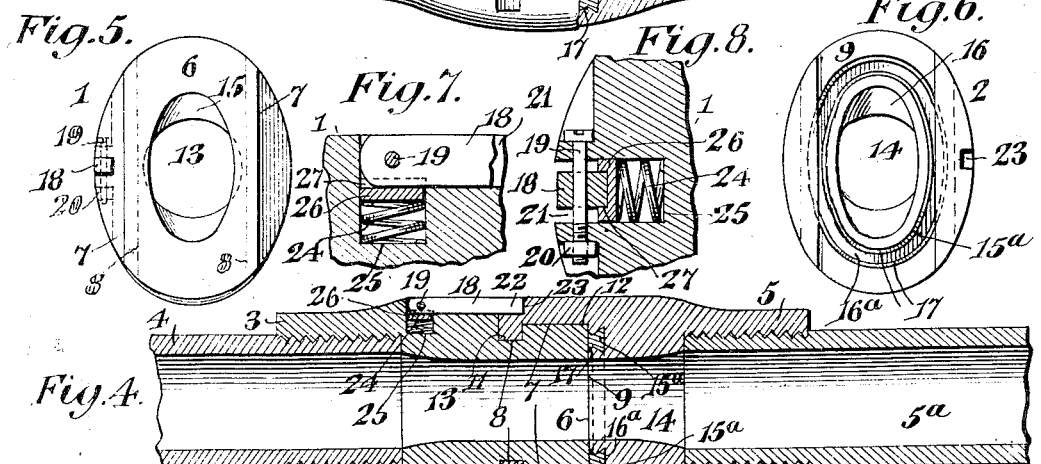
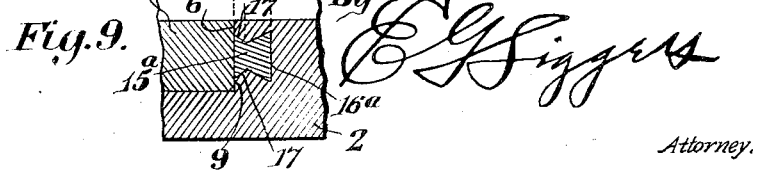
WITNESSES:
Jas. K. McCathran
J. T. Mawhinney
INVENTOR
L. O. Markham,
By E. G. Siggers
Attorney.

UNITED STATES PATENT OFFICE.

LORENZO O. MARKHAM, OF ABERDEEN, WASHINGTON.

PIPE-JOINT.

1,210,090.

Specification of Letters Patent.

Patented Dec. 26, 1916.

Continuation in part of application Serial No. 11,770, filed March 3, 1915. This application filed December 28, 1915. Serial No. 69,057.

*To all whom it may concern:*

Be it known that I, LORENZO O. MARKHAM, a citizen of the United States, residing at Aberdeen, in the county of Grays Harbor and State of Washington, have invented a new and useful Pipe-Joint, of which the following is a specification.

This invention has reference to pipe joints, and this application constitutes a continuing application of that filed March 3, 1915, bearing Serial Number 11,770, and which was allowed June 29, 1915.

An object is to provide a pipe joint by means of which lengths of pipe may be connected together or disconnected from each other with the greatest facility without the necessity of tools, and when connected will produce a fluid tight joint.

In places where it is customary to employ long lengths of pipe and to drag such lengths of pipe through underbrush and the like, it has heretofore been customary to employ ordinary straight couplings and ordinary unions which, in the case of unions, require packing, and moreover, require the use of such tools as wrenches.

In accordance with the present invention the pipe joint is made of two matching sections with the meeting ends beveled with respect to the longitudinal axis of the joint, while adjacent to the meeting ends the respective members of the joint are provided with tongue and groove connections which may go together on a line perpendicular to the longitudinal axis of the joint. This permits the use of accurately ground surfaces where the joined ends meet, so that with the aid of a gasket the joint becomes fluid tight, and as water is the usual fluid employed, the joint may be said to be water tight.

To avoid sharp corners or projections and excessive diameter in one direction, the joint where the two sections meet is made elliptical in cross-section with the longer axis of the ellipse coincident with the path of movement of the two parts into and out of engagement. Because of its elliptical form, which because of its rounded contour, avoids any interference with movements of the pipe through underbrush and the like, the passage through the pipe joint is, where the meeting surfaces engage, also made elliptical, so that its cross-sectional area at such point is as large as at the ends where the passage through the pipe joint is circular in cross-section.

Since the meeting edges of the two members of the pipe joint, where beveled, may be made of relatively large area, and of larger area than the tongue and groove connections, especially in the absence of any projecting parts, and since the angle of bevel or inclination may be relatively slight, the two parts of the pipe joint may be moved together by hand until very nearly in the final position, and then by the blow of a hammer or some other driving implement, or even a stone if nothing else be available, the two members of the pipe joint are driven so tightly together that no ordinary shock or jar will disturb them. At the same time they may be readily driven apart when it is desired to disconnect the two members of the pipe joint.

Another object of this invention is to provide the relatively laterally movable members with a latch, which is counter-sunk in the outer faces of the members, and which may be easily operated by the fingers to release and lock the members, as is desired. This feature of the invention contemplates the provision of an improved spring means for retaining the latch in either locked or released position, and for maintaining the latch in true longitudinal alinement with the members, and the peculiar mounting of the spring means.

A further feature of the present invention is in the provision of a packing gasket or ring which is peculiarly mounted in one of the ground faces of the coupling, the ring being held within the face and being permitted to expand at its outer end or face, so as to insure the sealing of the coupling.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation of the pipe joint. Fig. 2 is an elevation of the pipe joint as seen from a point of view at right angles to that of Fig. 1. Fig. 3 is a view similar to Fig. 2 with one member of the pipe joint in longitudinal diametric section. Fig. 4 is a longitudinal diametric section through the pipe joint and adjacent ends of pipes connected thereby, the plane of the section being at right angles to that of Fig. 3. Figs. 5 and 6 are end elevations of the respective members of the pipe joint. Fig. 7 is an enlarged sectional fragmentary view of the inner end of the locking latch and retaining means therefor. Fig. 8 is an enlarged sectional view of the same, taken at right angles to the showing in Fig. 7. Fig. 9 is an enlarged fragmentary sectional view of one of the coupling members, showing the packing mounted therein, and being compressed. Fig. 10 is a fragmentary sectional view of the coupling member with the packing ring therein, showing the outstanding position of the same when released and expanded.

Referring to the drawings, there is shown a pipe joint comprising two members 1 and 2. The member 1 has one end 3 interiorly tapped for the reception of the threaded end of a pipe 4, and the member 2 has one end 5 interiorly tapped for the reception of the threaded end of a pipe 5ª.

That end of the joint member 1 remote from the tapped end 3 is of elliptical cross-section with the outer end face 6 slightly inclined or beveled with respect to a diametric plane perpendicular to the longitudinal axis of the member 1.

The pipe member 1 adjacent to the bevel edge 6 and on opposite sides of the long diameter of the elliptically formed end is narrowed along the shorter diameter to form laterally extended faces 7 in substantially chord relation to the circumferential portion of the elliptical end, and between these faces 7 and the body of the member 1, at the side of each face 7 remote from the bevel edge 6, there is produced a groove 8 parallel with a corresponding long diameter of the elliptical end.

The coupling member 2, at the end remote from the end 5, is also of elliptical cross-section similar to that of the member 1 and terminates in an end face 9 correspondingly beveled to the bevel of the face 6 of the member 1. Extending from the face 9 lengthwise of the member 1 are two wings 10 spaced apart in the direction of the shorter axis of the ellipse, and each terminating at the outer end in an elongated inturned tongue 11 adapted to the corresponding groove 8 in the member 1. The spacing apart of the inner walls of the projections or wings 10, which inner walls are in parallel relation and are indicated at 12, is such as to receive between them the portions of the member 1 having the faces 7, which faces are broader in the direction of the length of the member 1 than is the width of each groove 8 in the same direction.

Extending lengthwise through the member 1 is a central passage 13, and extending lengthwise through the member 2 is a similar lengthwise passage 14. The passage 13 where approaching the surface 6 is narrowed in the direction of the shorter axis of the ellipse and elongated in the direction of the longer axis of the ellipse to form an elliptical mouth portion 15 in general conformity to the elliptical shape of the end of the coupling member 1 terminating in the surface 6. The passage 14 has a similarly shaped mouth 16 matching the mouth 15 when the coupling members are in proper engagement. Owing to the narrowing of the beveled faces of the coupling members where meeting, due to the elliptical form of such ends of the coupling members, a passage of even diameter straight through the coupling would render the walls at these meeting edges unreasonably thin, but there is ample thickness of metal in the direction of the long axis of the ellipse. For this reason the mouth openings 15 and 16 are elongated in the direction of such long axis to provide passage areas at these points equal to the cross-sectional area of the round or cylindrical portion of the passages where the pipes 4 and 5ª are connected to the coupling members.

In one of the end faces, which are beveled and meet when the coupling members are interlocked, preferably the end face 9, there is seated a gasket or packing ring 15ª. As may be best seen from Fig. 9 of the drawings, a dove-tailed groove 16ª is formed in the face 9 to receive and retain therein the packing ring or gasket 15ª. The outer opposite edges of the dove-tailed groove 16ª are beveled, as at 17, to admit of the spreading or flaring of the outer edge or face of the gasket 15ª to seal the joint between the faces 6 and 9. It is, of course, understood that this packing ring 15ª, and this retaining dove-tailed groove 16ª extend annularly about the central opening 14 in the member 2, and are equally spaced at all sides of the member 2 from the inner wall of the same.

It may be found convenient to provide means for securing the members 1 and 2 together when they are interlocked, so as to prevent them from sliding sidewise or laterally from each other under the spring action or tension of the pipes, or other fluid carrying devices 4 and 5ª.

With this purpose in view, the present invention provides a latching means in the form of a latch lever 18 counter-sunk in the relatively broad side of the member 1, and pivoted at its inner end upon a detachable pivot pin 19, preferably in the form of a screw or bolt, which is suitably countersunk in the side of the member 1, passing in the direction of a chord through the member 1, and being held in position by a counter-sunk nut 20, or the like, which engages in threaded relation with the outer end of the bolt 19. The latch lever 18 lies in a recess 21 formed longitudinally in the side of the member 1, and has its inner end apertured and disposed in the longitudinal plane of the bolt 19, so as to pivotally mount the latch lever on the bolt and admit of the free rotation of the lever. As shown in Figs. 1, 2 and 4, the latch lever 18 is swung down into locked position and wherein its outer end or nose 22 lies in a recess or notch 23 formed in the opposite member 2, and in longitudinal alinement with the recess 21 in the member 1. When the members are brought into alinement by their relative lateral sliding movement, and the members are entirely closed, the recesses 21 and 23 are brought into longitudinal registry. The latch lever 18 may now be swung down or inwardly into these registering recesses to engage the opposite walls thereof, and thus hold the members 1 and 2 from lateral displacement with respect to each other. When the latch lever 18 is swung down, it lies flush with the outer surface of the coupling, so as to prevent any obtruding parts which are liable to catch in surrounding objects to injure the coupling or the objects with which they engage.

The present invention also includes means for yieldingly holding this latch lever in locked position, or for holding it in released position, so that the members may be separated without being hampered by the latch lever. This means comprises a helical spring 24, seated in a pocket 25 formed immediately beneath the pivotal support or heel of the latch 18, and immediately beneath the pivot bolt 19. A cap or disk 26 is fitted in the pocket or recess 25, which latter is of interior cross-sectional configuration, preferably conforming to the contour of the disk or cap 26, so as to guide the latter in its vertical movement under the action of the spring 24. The disk or cap 26 is normally urged upwardly against the heel of the latch 18, so as to normally exert a spring tension on the latch 18 to hold it in its locked position, or in its released position when swung over to engage the upper edge or side of the latch with the disk 26. From Figs. 7 and 8, it will be noted that the upper face of the cap or disk 26 is provided with a diametrically extending groove or recess 27 of a width sufficient to receive the lower edge of the latch lever 18 therein for the purpose of holding the disk 26 from turning upon the upper end of the spring 24, and also for the purpose of centering the latch lever 18 in the recess 21. It will be noted that as the latch lever 18 is swung upwardly out of locking position, the rounded heel of the latch rides in the recess 27 and is retained therein, so that the latch lever bears at all times centrally and evenly on the disk or cap 26.

The faces 6 and 9 are ground into conformity one with the other, so that when one member of the coupling is moved into engagement with the other by engaging the tongues 11 in the grooves 8, this movement is performed with ease until finally the beveled edges 6 and 9 are brought into contact. The parts are so proportioned that this contact occurs just before one coupling member is in full alinement with the other. Now, by the aid of a hammer or some other driving means by which a blow may be given to one side of the coupling in line with the direction of movement of the coupling members when engaging, these coupling members are forcibly moved into full alinement where the friction of the faces 6 and 9, and the friction of the tongues 11 in the grooves 8, firmly hold the two members of the coupling in engagement against all ordinary forces tending to separate them. The faces 6 and 9 present relatively large surfaces so that when they are once in frictional engagement a considerably greater force than that to which the coupling members are subjected when in use is necessary to cause a disengaging movement of the coupling members with relation to each other.

When the coupling is used in locations where the pipe is dragged over the ground and through brush and the like, all sharp corners or projections must be avoided, and with the present invention are avoided, the coupling members where joining having their exteriors in the form of gentle curves extending lengthwise of the coupling with no sharp corners liable to catch upon anything. The coupling of the present invention is most readily connected and disconnected, has no loose gaskets or other means liable to be misplaced or lost, and when put together provides a water tight joint having no liability of accidental separation, and, moreover, the full capacity of the water pipe is provided through the coupling by reason of the elliptical form of the mouth of the passage through the coupling at the meeting ends of the coupling members.

Of course, it will be understood that instead of connecting pipes 4 and 5ª as shown, the coupling may be provided with any other kinds of connecting pipes, whether metallic pipes, or hose or the like, but as any of a great variety of such pipes may be employed, it is not deemed necessary to illustrate them in the drawings.

This improved coupling may be used with or without the locking feature, but it is found particularly desirable to use the locking device when the coupling is used as a hose coupling. In Fig. 10 of the drawings, it is clearly shown that when the packing ring 15ª is released, when the coupling members 1 and 2 are disconnected, the outer edge of the ring projects substantially one-sixteenth of an inch, beyond the abutting face 9 of the member 2, which carries the ring. In other words, the packing springs out of the beveled portions of the face 9 at the opposite sides of the recess 16ª, the beveled portions 17 admitting of the expansion or spreading of the packing ring when the members 1 and 2 are brought together into tight fitting engagement. This latter spreading of the packing ring 15ª is shown to advantage in Fig. 10. The improved coupling provides for a ground joint, and at the same time a gasket joint, so that the coupling may withstand considerable wear, and maintain considerable pressure without leakage.

It is within the spirit of this invention to change the design and arrangement of the several elements which go to make up the coupling and the latch means therefor, as far as the scope of the following claims permit, in order to adapt the coupling to the various uses to which it may be applied, and in order to interchange the latch mechanism or gasket packing which is described above as having a certain specific location.

What is claimed is:—

1. A pipe coupling comprising two members having tongue and groove connections extending laterally of the length of the coupling with the meeting ends of the coupling beveled with respect to the direction of movement of the coupling members together, and with the meeting faces ground to provide a fluid-tight joint, said coupling being of elliptical cross-section at the meeting ends of its members and with the fluid conducting passages through the coupling members of elliptical form at the meeting ends of said members to provide a cross-sectional area as great as that at the outer ends of these members.

2. A pipe coupling comprising two members having tongue and groove connections extending laterally of the length of the coupling with the meeting ends of the coupling beveled with respect to the direction of movement of the coupling members together and with the meeting faces ground to provide a fluid tight joint, one of said meeting faces having a dove-tailed annular groove therein, which is flared at its outer side, a gasket fitted in the dove-tailed groove and adapted to be compressed between said faces, and to expand in the flared outer side of the groove to seal the joint, said coupling being of elliptical cross-section at the meeting ends of its members, and with the fluid conducting passages through the coupling members of elliptical form at the meeting ends of said members, to provide a cross-sectional area as great as that at the outer ends of these members.

3. In a pipe coupling including two members having tongue and groove connections extending laterally of the length of the coupling, a latch pivotally mounted in countersunk relation in the side of one of the members, said member having a pocket beneath the pivoted end of said latch and having a recess extending longitudinally of the latch, the opposite member having a corresponding recess in its outer face in registry with the first recess to receive the outer end of said latch when the members are coupled, whereby the latch spans the tongue and groove connection, a spring in said pocket, and a cap mounted on the outer end of the spring for movement in the pocket, and provided with a recess in its upper face to receive the heel of said latch.

In testimony, that I claim the foregoing as my own, I have hereto affixed my signature in the presence of two witnesses.

LORENZO O. MARKHAM.

Witnesses:
 LOUIS H. DIX,
 SADIE B. SHAPTON.